(12) United States Patent
Faivre

(10) Patent No.: US 8,998,256 B2
(45) Date of Patent: Apr. 7, 2015

(54) LOADER STAND

(75) Inventor: Damien Faivre, Apremont (FR)

(73) Assignee: Deere & Company, Moline, IL (US)

( * ) Notice: Subject to any disclaimer, the term of this patent is extended or adjusted under 35 U.S.C. 154(b) by 851 days.

(21) Appl. No.: 13/167,338

(22) Filed: Jun. 23, 2011

(65) Prior Publication Data
US 2011/0318154 A1 Dec. 29, 2011

(30) Foreign Application Priority Data

Jun. 29, 2010 (DE) .......................... 10 2010 030 680

(51) Int. Cl.
*E02F 9/00* (2006.01)
*E02F 3/627* (2006.01)
*E02F 3/96* (2006.01)
*A01D 87/00* (2006.01)

(52) U.S. Cl.
CPC .............. *E02F 3/6273* (2013.01); *E02F 3/968* (2013.01); *Y10S 414/133* (2013.01); *Y10S 414/125* (2013.01); *A01D 87/0076* (2013.01)

(58) Field of Classification Search
CPC ............................... E02F 3/6273; E02F 3/968
USPC ......... 414/685, 686, 912; 172/274; 280/763.1
See application file for complete search history.

(56) References Cited

U.S. PATENT DOCUMENTS 2,852,271 A * 9/1958 McDonald ...................... 182/88
4,619,060 A * 10/1986 Knowlton ....................... 37/231
6,039,149 A * 3/2000 Bedja et al. ..................... 182/20
6,247,888 B1 * 6/2001 Guiet ............................ 414/686
2010/0095563 A1 * 4/2010 Webb et al. ..................... 37/444

FOREIGN PATENT DOCUMENTS

| DE | 2262996 | * | 7/1973 | ............ E02F 3/6273 |
| DE | 69909024 | | 4/2004 | |
| DE | 102005053041 A1 | | 5/2007 | |
| EP | 0965696 | | 12/1999 | |
| EP | 1389656 A1 | | 2/2004 | |
| JP | 2000170196 A | | 6/2000 | |
| WO | WO2008070901 | * | 6/2008 | ............ E02F 3/6273 |

OTHER PUBLICATIONS

European Search Report issued in counterpart application No. 11171011.7 with partial English translation, dated Nov. 5, 2014 (8 pages).

* cited by examiner

*Primary Examiner* — Scott Lowe

(57) ABSTRACT

A front loader (10) for a tractor with a parking stand unit (28) including a parking support (30) pivotably mounted on the front loader arm (12). A locking brace (32) is pivotably seated at one end on the parking support (30) and is movably guided at the other end by a guidance means (50) formed on the locking brace (32) and at least one guide groove (48, 49) formed in the parking support (30). The guidance means (50) can be brought by pivoting the parking support (30) into the parking position (P3) into a locking position in which it comes to rest at a stop (66) formed in the guide groove (48, 49). The guidance means (50) can be pressed against the stop (66) and fixed in the locking position by a support force of the front loader arm (12) acting in the parking position (P3) on the locking brace (32).

6 Claims, 3 Drawing Sheets

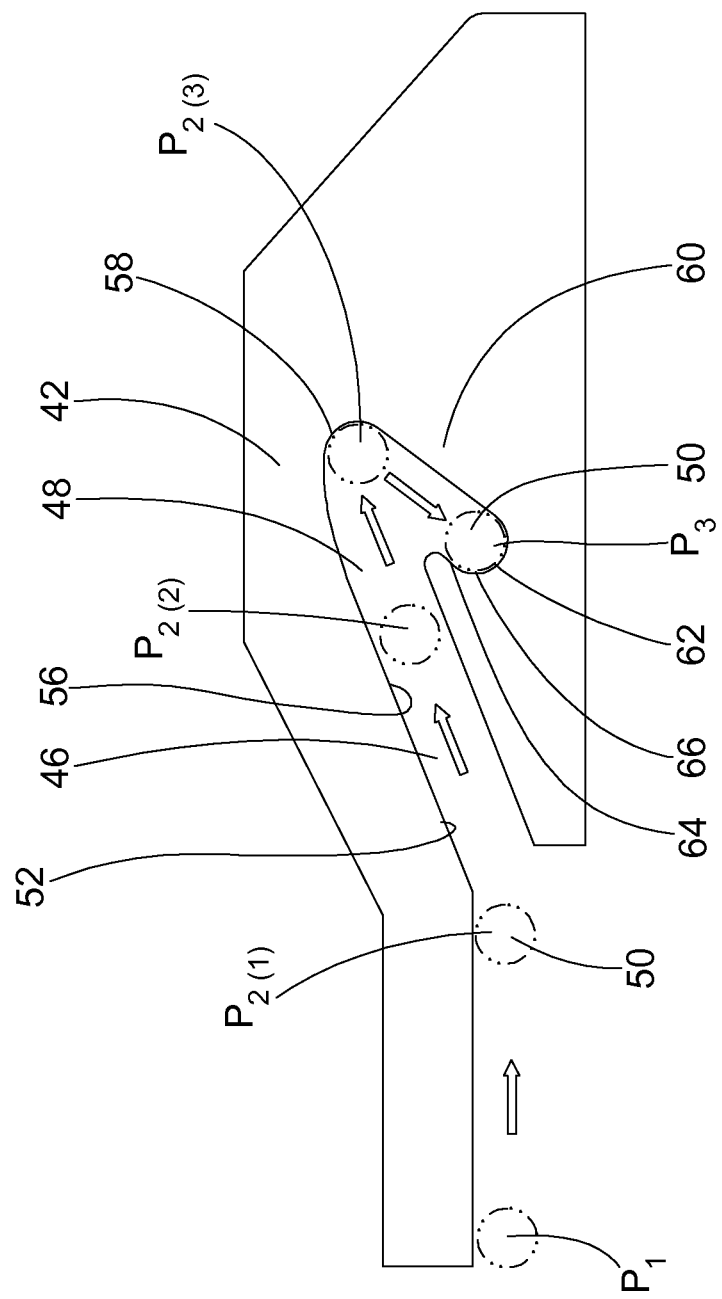

LOADER STAND

FIELD OF THE INVENTION

The invention relates to a front loader for a tractor, with at least one front loader arm and a parking stand unit mounted on the front loader arm for parking the front loader. The parking stand unit includes a parking support pivotably mounted on the front loader arm that can be pivoted from an operating position into a parking position.

BACKGROUND OF THE INVENTION

The use of front loaders for moving material with a tractor is well known. For this purpose, front loaders can be mounted on or decoupled from a frame bracket provided on the tractor. The front loader typically comprises two parallel arms that extend at the front end of the tractor and are equipped with a corresponding loading tool, such as a shovel, a gripper, a loading fork, etc., the arms and the front loader tool typically being operable by hydraulic or electrical actuators. Parking stand units that comprise a pivotable parking support that can be brought into a parking position and lock there can be provided on the arms of the front loader. In the parking position, the front loader can be decoupled from the tractor and be supported on the parking support in such a manner that the arms are held in an upright coupling and decoupling position when the front loader is parked, so that decoupling or coupling the front loader is possible by releasing (or closing) the front loader lock and subsequent (or previous) simple maneuvering of the tractor.

Such a parking stand unit is disclosed in WO 2008/070901 A1. The parking stand unit disclosed there comprises a parking support that is pivotably mounted on the arm of a front loader and is pivotable from an operating position (in which the front loader is coupled to the tractor) into a parking position (in which the front loader can be decoupled and set down or parked). An additional locking brace extends between the arm and the parking support and is guided at one end pivotably on the arm, and movably on the parking support at the other. The locking brace is additionally connected to a locking bar that extends along the parking brace and undertakes a locking as soon as the parking support runs against a stop and reaches the parking position. An automatic unlocking of the locking bar as well as a subsequent movement of the parking stand unit into the operating position is enabled by automatic actuation of the locking bar and the parking support by a tool holder formed on the front loader. In addition to the convenience of use, such an automatic operation can also have disadvantages. Thus such a parking stand unit requires, in addition to a design with a great variety of parts, a detailed interaction between tool holder and parking stand unit or parking support, with which high complexity and costs are connected on the one hand and whereby, on the other hand, the parking stand unit can only be used on front loaders with a tool holder matched to the parking stand unit.

The problem underlying the invention is to specify a parking stand unit of the type mentioned above by means of which the above-mentioned problems are solved.

SUMMARY OF THE INVENTION

According to the invention, a front loader of the type mentioned above is constructed in such a manner that the stop is formed in the guide groove in such a manner that the guidance means can be pressed against the stop and fixed in the locking position by a support force of the front loader arm acting in the parking position on the locking brace. The special formation of the stop in the guide groove allows a reduction of parts with respect to the known design in the sense that no additional locking lever is provided, but instead locking results from the interaction of the guidance means and the shape or formation of the stop. The entire parking stand unit can thus be designed more simply and economically. Moreover, a parking stand unit according to the invention can be used independently of the design and shape of a tool holder on a variety of front loaders.

The parking support is formed as a U-profile wherein the at least one guide groove is formed by at least one profiled plate on a sidewall of the U-profile. The parking support, however, could equally well have a different profile shape, for example an L-profile, so that the profiled plate forming the guide groove is fixed to the side of one of the L-profile legs. It is also conceivable to construct the parking brace as an I-profile.

The profiled plate has a profile edge forming the guide groove, which in certain areas has a direction-changing, spiral-shaped or hook-shaped contour, on the edge of which the stop adjoins in such a manner that the guidance means undergoes a change of direction when the parking support is pivoted from the operating position into the parking position and the support force acting on the locking brace presses the guidance means against the stop. When the parking support is pivoted into the parking position by the downward pivoting motion of the parking support under its own weight or by an actuation, the guidance means formed on the locking brace is guided along the profile edge and moved in the direction of the stop as soon as the support force acting on the locking brace takes effect. Corresponding to the movement of the guidance means, the locking brace is likewise pivoted downward by its own weight and by the downward pivoting motion of the parking support. The guidance means is pressed or pushed against the profile edge as well and moves on it like a carriage. The direction-changing contour of the profile edge formed at the end of the guide groove supports or guides the guidance means automatically against the stop. The stop is shaped in such a manner that it forms an enclosure or an embedding of the guidance means, so that the guidance means is partially surrounded by the shape or contour of the stop when it reaches the locking position and further displacement due to the support force acting on the locking brace and the guidance means is prevented. Depending on its construction, the profile plate can be fixed only on one side of the U profile or on both sides, so that a two-sided design can achieve a two-sided guidance of the guidance means and thus a more robust guidance of the guidance means.

A spring-loaded latch is formed on the parking support that can be brought into engagement with a catch device formed on the front loader arm for locking the parking stand unit in the operating position. For this purpose, a simple bracket or a projection can be arranged on the front loader arm on which the latch can engage or hold itself due to its spring tension, as soon as the parking support has been pivoted into operating position.

The invention, as well as further advantages and advantageous refinements and configuration of the invention, will be further described and explained below with reference to the drawing, which shows an exemplary embodiment of the invention.

BRIEF DESCRIPTION OF THE DRAWINGS

FIG. 3 shows a schematic side view of a profile plate from FIG. 2 with a guide groove and guidance means.

DESCRIPTION OF THE PREFERRED EMBODIMENTS

Figure 1:
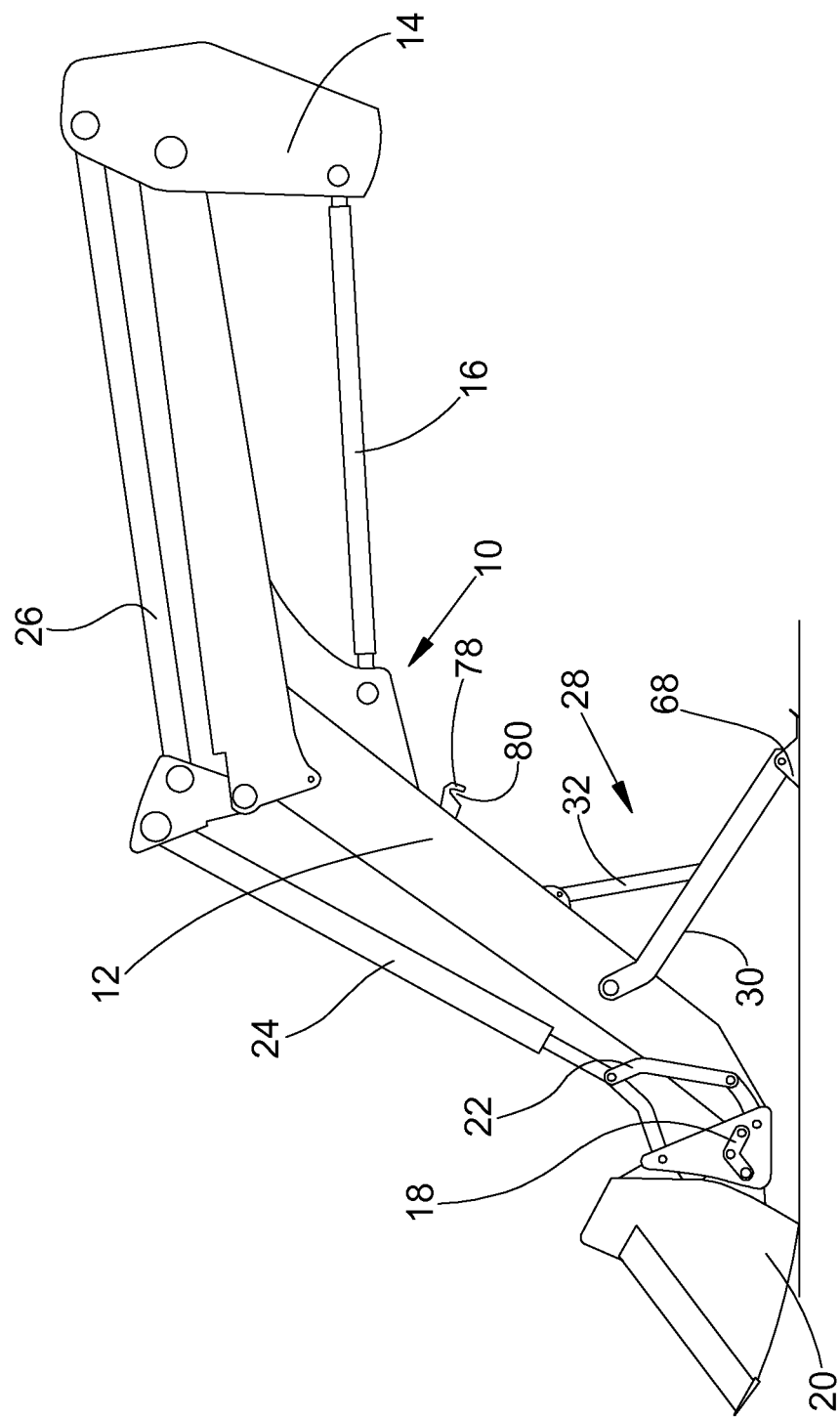
FIG. 1 shows a schematic side view of a front loader with a parking stand unit according to the invention.

FIG. 1 shows a front loader 10 that can be coupled to agricultural vehicles such as tractors and operated thereon. The front loader 10 has a front loader arm 12, which can be coupled to the vehicle via a mast arrangement 14 and a bracket (not shown) mounted on the vehicle. An actuator 16 such as a hydraulic cylinder, for raising and lowering the front loader arm 12 runs between mast arrangement 14 and front loader arm 12. A tool holder 18, which is equipped with an interchangeable front loader tool 20, here in the form of a front loader shovel, is arranged at the free end of the front loader arm 12. The tool holder 18, and thus also the front loader tool 20, can be pivoted relative to the front loader arm 12 via an actuation linkage 22, which can be controlled via a second actuator 24. Another linkage 26 is used for parallel guidance of the tool holder 18 or the front loader tool 20 while the front loader arm 12 is being raised and lowered.

Figure 2:
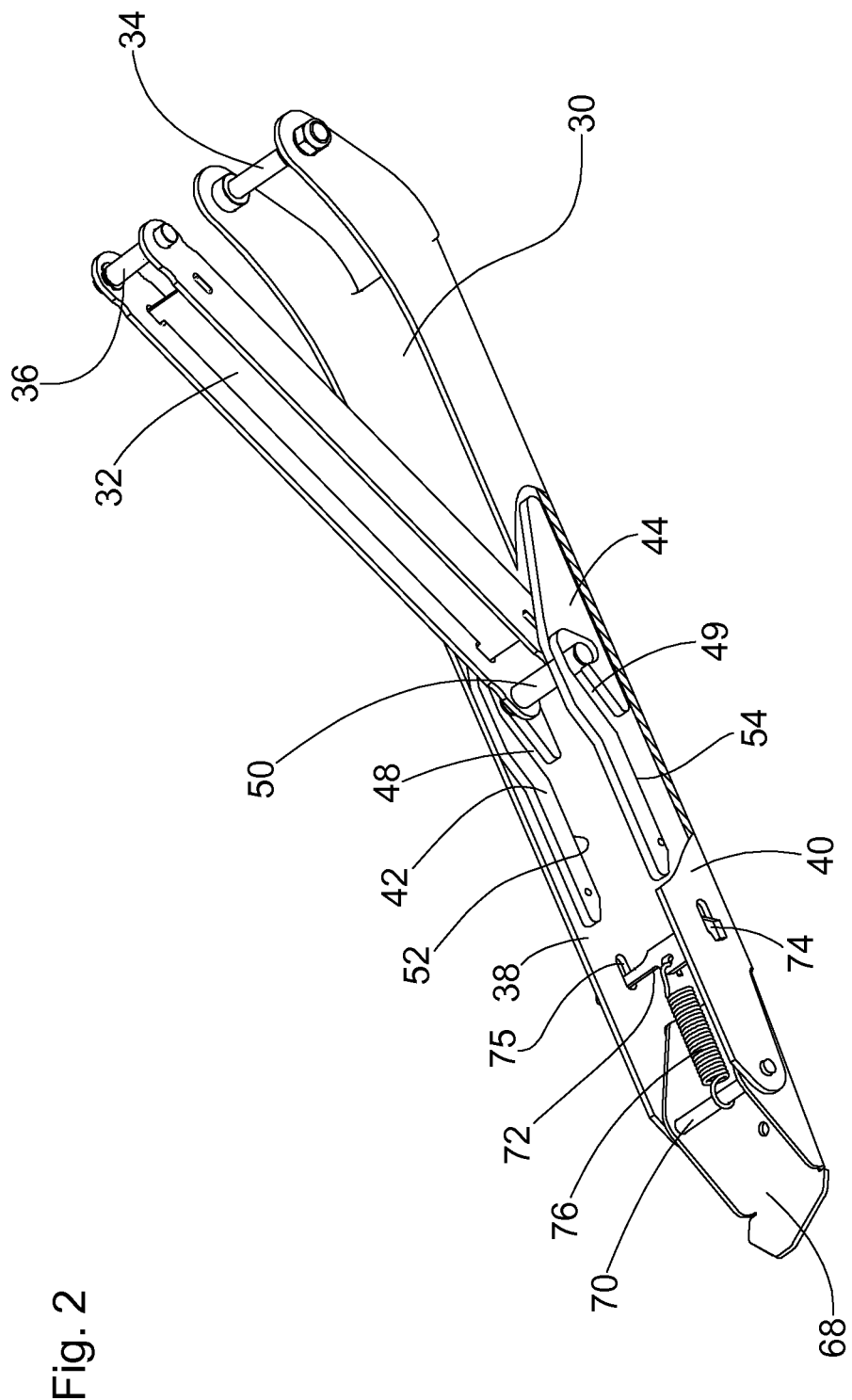
FIG. 2 shows a parking stand unit according to FIG. 1 in a perspective side view in the parked position.

The front loader further comprises a parking stand unit 28 arranged on the front loader arm 12, as shown in detail in FIG. 2.

The parking stand unit 28 comprises a parking support 30 pivotably articulated on the front loader arm 12 and a locking brace 32, likewise pivotably articulated at one end on the front loader arm 12 and also movably connected at the other end to the parking support 30. The locking brace 32 can be brought into a locking position (as shown in FIG. 2) on the parking support 30, which position it assumes as soon as the parking support 30 has been pivoted into a parking position, as will be described in more detail below. In the parking position or locking position, the parking support 30 is supported and locked relative to the front loader arm 12 in a position determined by the length and the pivot angle of the locking brace 32.

The parking support 30 is mounted at one end with a pivot pin 34 at a lower area of the free end of the front loader arm 12 on the latter. The locking brace 32 is likewise mounted or articulated at one end with a pivot pin 36 on the front loader arm 12 above the mounting point of the parking support 30.

The parking support 30 is constructed as a U-profile and has two sidewalls 38, 40 extending in the direction of the front loader arm 12. A respective profile plate 42, 44 is arranged on, preferably welded to, the sidewalls 38, 40 in the interior of the parking support 30.

Each profile plate 42, 44 is provided with a cutout 46, by which a guide groove 48, 49 or guide track is created that is bounded by a profile edge 52, 54 formed on the profile plate 42, 44, along which edge a guidance means 50 is movably guided.

The guidance means 50 is constructed as a bolt and is mounted at the other end of the locking brace 32 in such a manner that the end of the bolt can engage in the respective guide grooves 48, 49 of the profile plates 42, 44. Thus the locking brace 32 is movably articulated firstly (at one end) on the front loader arm 12 and secondly (at the other end), movably along the profile edges 52, 54, on the guidance means 50 constructed as a bolt on the parking support 30.

The construction of the respective guide grooves 48, 49 is shown in detail in FIG. 3 (on profile plate 42 for the sake of example). The profile edges 52, 54 guiding the guidance means 50 (bolt) respectively comprise in certain sections a direction-changing contour, i.e., they have a course 56 rising in the direction of the one end of parking support 30 and ending in a first turning point 58, which is adjoined by a falling course 60 running in a reverse direction opposite to the rising course 56. The falling course 60 of the respective profile 52, 54 in turn ends in a second turning point 62 adjoined by another rising course 64, the second turning point 62 and the subsequent additional rising course 64 forming a stop 66 that forms the end of the respective guide grooves 48, 49. The stop 66 is semicircular in shape, so that it partially encloses the respective end of the guidance means 50, as soon as the latter is moved against the stop 66. An operating position P1, several intermediate positions P2 and a parking position P3 are defined for the parking stand unit 28. In the operating position P1, both the parking support 30 and the locking brace 32 are pivoted or folded in or folded up until they contact the front loader arm 12. The parking stand unit 28 is preferably brought into the operating position when the front loader 10 is to be put into operation, i.e., coupled to a vehicle. In the parking position P3 (as shown in FIGS. 1 and 2) both the parking support 30 and the locking brace 32 are pivoted or folded out. The parking stand unit 28 is preferably brought into the parking position P3 when the front loader 10 is to be taken out of operation, i.e. decoupled from a vehicle and set down or parked. All positions that the parking stand unit 28 assumes between the operating position P1 and the parking position P3 represent one of the intermediate positions P2.

The positions of the guidance means 50 movable in the guide grooves 48, 49 are illustrated in FIG. 3 for the operating position P1, the parking position P3 and three different intermediate positions P2(1), P2(2), P2(3).

Starting from the operating position P1, the guidance means 50 rests against the profile edge 52 in an initial section of the guide groove 48, 49. If the parking stand unit 28 is then folded out or is to be brought or swiveled into the parking position P3, the guidance means 50 passes through various positions along the profile edge 52 and successively assumes the positions P2(1), P2(2) and P2(3). In the process, the guidance means 50 is automatically guided along the profile edge 52 by the pivoting motion of the parking support 30 and is displaced or moved by the rising course 56 up to the turning point 58 at which the guidance means 50 assumes the position P2(3). The pivoting movement of the parking support 30 can be carried out by an operator or also due to the force of gravity by the parking support's own weight. In the intermediate position P2(3), the guidance means 50 reaches the turning point 58. There the park stand device 28 occupies a maximum pivot angle relative to the front loader arm 12. The gravitational force of the parking support 30 pushes the guidance means 50 against the turning point 58, whose design blocks any further pivoting of the parking support 30. In the interaction with the locking brace 32, which is connected via the guidance means 50 to the parking support 30, the maximum pivot angle is limited. In this intermediate position P2(3) the front loader 10 can then be decoupled from the vehicle. As soon as the mast arrangement 14 and the front loader arm 12 have been separated from the vehicle and the bracket, the front loader 10 begins to tilt due to gravitational force via the parking support 30 and initiates a support force that is transmitted via the locking brace 32 to the guidance means 52. The support force displaces the guidance means 52 in the guide groove 48, 49 along the falling course 60 of the profile edges 52, 54 up to the second turning point 62 and pushes the guidance means against the stop 66. So long as a support force acts on the locking brace 32, the guidance means 50 is fixed or captured in the stop 66 and the parking stand unit 28 is locked. The guidance means 50 is blocked or restrained by the stop 66, so that the entire support torque of the front loader 10 is captured by the parking stand unit 28, or the front loader 10 can be supported and set down by the parking stand unit 28. Removal of the parking stand unit 28 from the parking position P3 takes place by coupling and lifting the front loader 10, so that the support force is canceled out, and the locking brace 32 can be manually unlocked, by moving or pushing the guidance means 50 through the guide groove 48, 49 in the opposite direction by slightly moving the locking brace 32. The parking stand unit 28 can then be pivoted back into the operating position P1.

At the free end of the parking support 30 an oscillating foot 68 is provided, which is mounted by means of a bolt 70 so as to pivot back and forth on the parking support 30 and provides a standing or support surface when the parking stand unit 28 is pivoted into the parking position P3.

A latching device 72 additionally runs between oscillating foot 68 and locking brace 32. The latching device 72 comprises a latch 74 that is accommodated by the side walls 38, 40, that in order to actuate seizably straddles the side wall 38 and that is under initial tension in the direction of the free end of the parking support 30 from a spring 76 that extends between the latch 74 and the bolt 70. The latch 74 is provided with space for movement by an elongated hole 75 formed in the side wall 38. Also provided is a catch device 78 that is mounted in the form of a plate furnished with a catch notch on the front loader arm 12 in such a manner that the latch 74 engages in the catch notch 80 in the operating position due to its initial spring tension and holds the parking stand unit 28 in the operating position or locks it in the operating position. By simply actuating the latch 74 inside the elongated hole 75 contrary to its initial spring tension (moving in the longitudinal direction relative to the parking support), the parking stand unit 28 can be unlocked and brought into the parking position.

The invention claimed is:

1. A front loader (10) for a tractor, with at least one front loader arm (12) and a parking stand unit (28) mounted on the front loader arm (12) for parking the front loader (10), wherein the parking stand unit (28) comprises a parking support (30) pivotably mounted on the front loader arm (12) that can be pivoted from an operating position (P1) into a parking position (P3), wherein the parking stand unit (28) further comprises a locking brace (32) that is pivotably seated at one end on the parking support (30) and is movably guided at the other end on the parking support (30) by means of a guidance means (50) formed on the locking brace (32) and a pair of guide grooves (48, 49) on a pair of profile plates arranged in an interior of the parking support (30), wherein the guidance means (50) can be brought by a gravitational force upon decoupling the front loader from the tractor pivoting the parking support (30) into the parking position (P3) into a locking position in which it comes to rest at a stop (66) formed within the guide grooves (48, 49), wherein the stop (66) is formed within the guide grooves (48, 49) in such a manner that the guidance means (50) presses against the stop (66) and fixed in the locking position by a support force of the front loader arm (12) acting in the parking position (P3) on the locking brace (32).

2. The front loader (10) according to claim 1, wherein the parking support (30) is constructed as a U-profile, wherein the pair of guide grooves (48, 49) are formed on a pair of profile plates (42) mounted on a side wall (38, 40) of the U-profile.

3. The front loader (10) according to claim 2, wherein the pair of profile plates (42) have has a profile edge (52) forming the guide grooves (48, 49), which in certain areas has a direction-changing contour, on which the stop (66) adjoins in such a manner that the guidance means (50) undergoes a change of direction when the parking support (30) is pivoted from the operating position (P1) into the parking position (P3) and the support force acting on the locking brace (32) presses the guidance means (50) against the stop (66).

4. The front loader (10) according to claim 1, further comprising a spring-loaded latch (74) formed on the parking support (30) and can be brought into engagement with a catch device (78) formed on the front loader arm (12) for locking the parking stand unit (28) in the operating position (P1).

5. A front loader (10) for a tractor, with at least one front loader arm (12) and a parking stand unit (28) mounted on the front loader arm (12) for parking the front loader (10), wherein the parking stand unit (28) comprises a parking support (30) pivotably mounted on the front loader arm (12) that can be pivoted from an operating position (P1) into a parking position (P3) by a gravitational force acting on the front loader upon separation from the tractor, wherein the parking stand unit (28) further comprises a locking brace (32) that is pivotably seated at one end on the parking support (30) and is movably guided at the other end on the parking support (30) by means of a guidance means (50) formed on the locking brace (32) moveable along a pair of guide grooves (48, 49) on a pair of profile plates arranged on a pair of sidewalls in the parking support (30), wherein the pair of guide grooves (48, 49) includes a direction-changing contour having a rising course 56, a first turning point 58, a falling course 60 running in a reverse direction opposite to the rising course 56, and a stop 66 forming the end of the guide groove.

6. The front loader (1) according to claim 5, wherein the parking support (30) is constructed as a U-profile and the pair of sidewalls (38, 40) extending in the direction of the front loader arm (12).

* * * * *